(12) United States Patent
De Pasquale et al.

(10) Patent No.: US 8,724,460 B2
(45) Date of Patent: May 13, 2014

(54) OPTIMIZING SIGNALLING LOAD IN A CELLULAR COMMUNICATION NETWORK

(75) Inventors: Andrea De Pasquale, Madrid (ES); Francisco Dominguez Romero, Madrid (ES); Ricardo José Alves, Lisboa (PT)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 116 days.

(21) Appl. No.: 13/283,509

(22) Filed: Oct. 27, 2011

(65) Prior Publication Data

US 2012/0106331 A1 May 3, 2012

(30) Foreign Application Priority Data

Oct. 27, 2010 (ES) ................................ P201031574

(51) Int. Cl.
*G01R 31/08* (2006.01)
(52) U.S. Cl.
USPC .......................................... 370/230; 370/237
(58) Field of Classification Search
None
See application file for complete search history.

(56) References Cited

U.S. PATENT DOCUMENTS

| 8,001,241 B2* | 8/2011 | Lee ................................ 709/224 |
| 2003/0021288 A1 | 1/2003 | Hayashi et al. |
| 2006/0230154 A1* | 10/2006 | Nguyenphu et al. .......... 709/227 |
| 2012/0106331 A1* | 5/2012 | De Pasquale et al. ........ 370/230 |
| 2012/0307736 A1* | 12/2012 | Tang et al. .................... 370/328 |

FOREIGN PATENT DOCUMENTS

WO 03/036883 A1 5/2003

OTHER PUBLICATIONS

European Patent Office Search Report dated Jan. 3. 2012 for EP 11 27 5133.

* cited by examiner

*Primary Examiner* — Robert Wilson
(74) *Attorney, Agent, or Firm* — Workman Nydegger

(57) ABSTRACT

The invention relates to a cellular communication network serving mobile terminals or devices and how to reduce the signalling load in said network by introducing an auxiliary device which holds data packets in order to minimize connections according to a pre-determined rule.

12 Claims, 2 Drawing Sheets

OPTIMIZING SIGNALLING LOAD IN A CELLULAR COMMUNICATION NETWORK

CROSS-REFERENCE TO RELATED APPLICATIONS

This Application claims priority to and the benefit of Spanish Patent Application No. ES P201031574, filed Oct. 27, 2010, which is incorporated herein by reference in its entirety.

FIELD OF THE INVENTION

The invention relates to a system, method and apparatus for reducing signalling load in a communications network using packet data queuing techniques.

BACKGROUND

With the rising level of penetration of smartphones or internet connected mobile devices, end users demand higher volumes of data transfer and need said data to be delivered as fast as possible.

The current generation of smartphones (e.g. i-Phone, Google Nexus One) make available to the end user a huge number of client applications, many of them causing a frequent transmission and reception of small amounts of data (e.g. Weather forecast, Facebook messages, etc.).

When frequent, small packets are sent by the Application Servers in the cloud (Cloud computing is Internet-based computing, whereby shared resources, storage, software, and information are provided to computers and other devices on demand, like the electricity grid) to the client application(s) in the terminal, the access network is forced to frequently establish and release Radio Access bearers (RABs or RBs) able to deliver those packets to the end user. Establishing/Deleting a Radio Connection involves an amount of signalling.

Most of the time, internet connected devices remain on idle state, just sending and receiving small amounts of data keeping connections alive which actually involves opening and closing connections.

All of the above causes a significant increase in the signalling load in the UMTS Terrestrial Radio Access Network (UTRAN) or GSM/EDGE Radio Access Network (GERAN), with subsequent need to increase the installed capacity in the network elements handling such a signalling, such as RNCs, and consequent increase in the capital expenditure from the network operator.

Therefore, it would be beneficial to be able to reduce the signalling load without significantly impacting the user experience.

SUMMARY OF THE INVENTION

According to one embodiment of the invention, there is provided a method for reducing the load signalling in a cellular communications network as claimed in claim 1. The method is based on the fact that a significant proportion of the connections established to Radio Access Bearers (RAB) or Radio Bearers (RB) are caused by the need to deliver in download a small number of packets, and these packets are originated by a multiplicity of applications with no stringent real-time delivery requirements; thus combining these packets would allow to reduce the number of connections to be established/released.

The invention thus proposes to queue into some network element (either inside or outside an RNC) the Network Originated in-bound (I/B) packet traffic of the users until a minimum amount of data is collected per each user, and after that finally establishing a RAB/RB to deliver the data.

The signalling load in the Radio Network Controller (RNC) would be reduced because only a single RAB/RB would be established or released within a period of time instead of doing the same several times to open one RAB/RB each time in order to carry a small amount of data.

As earlier stated the system and method proposed are transparent to end users, in order to minimize the impact on the user experience, the following criteria or mix of them can be used in order to trigger the establishment of a RAB/RB to deliver to the user the queued data:

Quantity of data: Proceed with the RAB/RB set-up if the stored data is, for example, higher than 1 kilobyte.

Packet Inspection: In order to not affect the user experience it is needed to inspect the packets and detect those packets which are transmitted by the background applications and not by the customer in real time. In this packet inspection it has to be detected if the application is pull or push, i.e. if the packet transmission from the network follows a request originated by the phone. One way to detect it is by analyzing the time difference between the current packet in the queue with its specific pair of TCP/IP source and origin and the latest pair of TCP/IP originated in the UL from the same UE having source and destination TCP/IP pair opposite to the previous one.

Max delay: proceed with the RAB/RB set-up if any of the packets in the queue are stored (delayed), for example, for more than 20 milliseconds and less than 30 seconds. The latter can be set up to 20 minutes.

RNC signalling Load: Optionally, the mechanism can be used only if the Signalling Load within the involved RNC is higher than a threshold.

Additionally to the criteria set above, the RAB/RB set-up is not is started to those user equipments (UEs) with either lower QoS profile. Said profiles is established by using the THP (Traffic Handling Priority) and the ARP (Allocation Retention Priority) which are two HLR parameters of the subscribed user profile.

Moreover, data queuing can be applied only to those user equipments [UE] generating a high amount of Signaling Load within a specific period of time. It would be needed to count the number of connections generated by every user equipment [UE] during 10 minutes and queue to those exceeding an access threshold value set in 5 RABs.

At least one of the above mentioned criteria is translated into rules which are implemented as instructions and commands in the programmable device; thus Radio Network Controller [RNC] signalling load would be decreased, and therefore less spending on Radio Network Controller [RNC] capacity would be done.

BRIEF DESCRIPTION OF THE DRAWINGS

For a better understanding of the present invention, reference will now be made, by way of example only, to the accompanying drawings in which:—

DETAILED DESCRIPTION OF A PREFERRED EMBODIMENT

Figure 1:
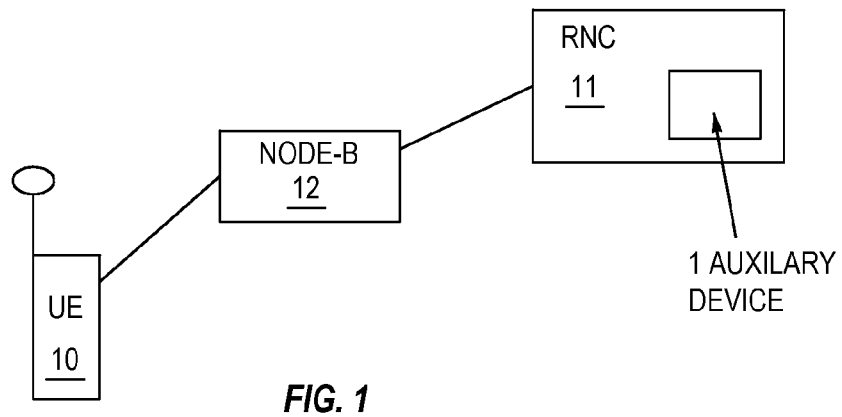
FIG. 1 depicts a diagram of the system of the invention.
Figure 2:
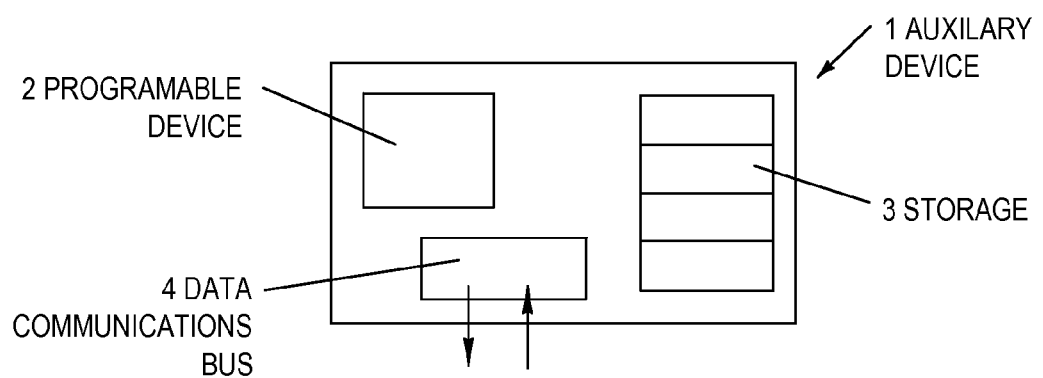
FIG. 2 depicts a block diagram of the signalling load reduction device.
Figure 3:
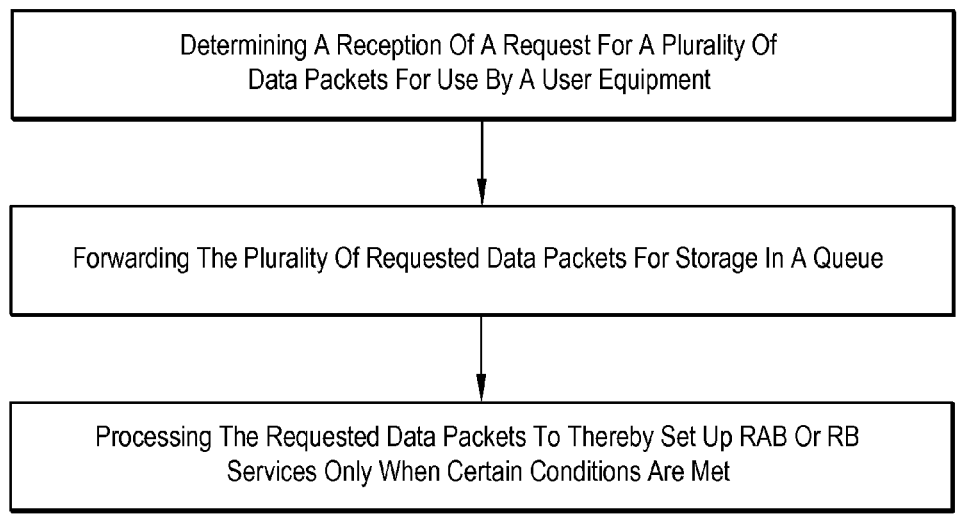
FIG. 3 depicts a flow chart of a method for optimizing signalling load.

Following the reference signs adopted in FIG. 1, there now follows a more detailed description of an embodiment of the invention.

Data packets are sent from a communications network to a User Equipment [UE] 10 by opening and closing connections between the User Equipment [UE] 10 and a Radio Network Controller [RNC] 11 via a Node B 12 to which it's connected.

A preferred embodiment of the invention is deployed in a high congestion situation in the Radio Network Controller [RNC] 11 for reducing the signalling load in this network element. Said reduction is achieved by implementing a series of rules or conditions stored in an auxiliary device 1 embedded in the Radio Network Controller [RNC] 11 and executed by a programmable device 2 of said auxiliary device 1, said auxiliary device 1 being furnished with a data communication bus 4 in order to establish a communication channel with elements of the network, such as the Radio Network Controller [RNC] 11, and storage means 3 for storing data packets creating a data packets queue containing those data packets set to be queued according to the above mentioned conditions.

When the signalling load, measured as a percentage of CPU load of the signalling processors of the Radio Network Controller [RNC], is higher than a threshold value set in the specifications of the Radio Network Controller [RNC], the programmable device of the auxiliary device brings about the following procedure in order to reduce the signalling load.

First, those User Equipments [UEs] which data packets are meant to be queued in order to reduce the signalling load are identified by determining the signalling coming from a node B of the network to which the User Equipment [UE] is connected.

If the User Equipment [UE] generates a number of connections higher than an access threshold value (the access threshold value could be set to 5 RABs in a period of 10 minutes, say), then said User Equipment [UE] is considered to be directly causing a high signalling load, consequently data packets are queued by the auxiliary device in its storage means. The same queuing could be applied if the User Equipment [UE] is marked with a low priority; which is typically marked by an operator with Allocation Retention Priority [ARP]—Traffic Handling Priority [THP] parameters.

Furthermore, for those identified User Equipments [UEs], the Radio Network Controller [RNC] will carry out a data packet inspection. Specifically when there are data packets coming from the GGSN towards the UE without any Radio dedicated connection [i.e. in idle or in Cell_PCH/URA_PCH]

Note that CELL_PCH and URA_PCH are UE states defined in the 3GPP spec 25.331 in which connectivity exists between the Radio Network Controller [RNC] and Core Network [CN], but the user equipment [UE] is not assigned any Radio Bearer [RB] to transmit or receive data. In either state, the User Equipment [UE] is able to quickly get assigned a Radio Bearer [RB] for data transmission or reception, but a very limited number of resources are used in the Radio Network Controller RNC in order to maintain the User Equipment [UE] in such a state.

Data packet inspection at the Radio Network Controller [RNC] checks whether data packets are an answer to a direct request coming from the User Equipment [UE] request or not. If so, then the data packet cannot be queued, this is done by analyzing the TCP/IP flows. Even in the very case that the request is coming from the User Equipments [UE] said request can be trigged by different applications, and data packets requested by some applications can be queued too, this can be done, for example, by inspecting TCP/UDP ports and then marking every kind of application with a "yes" or "no" to be queued.

Once those packets are identified for those User Equipments [UEs] and detected as: idle, Cell_PCH or URA_PCH; then the data packets are not delivered and therefore kept in the queue until:

There is a data threshold minimum value and a data threshold maximum value of data quantity to be stored in the queue, once those threshold values are surpassed the connection is established with the User Equipment [UE] and the data are delivered, this data threshold values are normally set in 1 Kbyte for the data threshold minimum value and 10 MB for the data threshold maximum value.

or the data packets have been queued for a time period, for example longer than a time threshold minimum value set in 20 ms and less than a time threshold maximum value set in 20 minutes or there is another application that needs to open a connection without possibility of queuing.

In another embodiment of the invention the auxiliary device is integrated in the Serving GPRS Support Node [SGSN].

In yet another embodiment of the invention the auxiliary device is arranged between the Radio Network Controller [RNC] and the Core Network [CN].

The invention claimed is:

1. A method for optimizing signalling load in a cellular communication network, the method comprising:
determining by a Radio Network Controller a reception of a request for a plurality of data packets for delivery to a User Equipment;
forwarding the plurality of requested data packets to an auxiliary device for storage in a queue;
processing by the auxiliary device the requested data packets to thereby set-up Radio Access Bearer (RAB) or Radio Bearer (RB) services for delivering the requested data packets from the queue to the User Equipment, wherein the auxiliary device processes said requested data packets only when at least one of the following conditions is met:
at least one requested data packet of the plurality of requested data packets has been stored in the queue for a period of time longer than a time threshold value;
a volume of the plurality of requested data packets stored in the queue exceeds a data threshold value; and
a request for the requested data packets is determined to have been triggered by a specific end user of the User Equipment.

2. The method according to claim 1 wherein a request for the requested data packets is determined to have been triggered by the specific end user of the User Equipment based upon TCP/IP flow analysis.

3. The method according to claim 2 wherein the TCP/IP flow analysis further comprises inspecting TCP/UDP ports used for the request for the requested data packets.

4. The method according to claim 3 further comprising detecting whether the request for the requested data packets is generated by a push application.

5. The method according to claim 4 wherein a set-up of the Radio Access Bearer (RAB) or Radio Bearer (RB) services is accomplished when the application is push application.

6. The method according to claim 1 wherein the plurality of requested data packets are stored in the queue when the User Equipment generates a number of Radio Access Bearer (RAB) number higher than an access threshold value within a specific period of time.

7. The method according to claim 1 wherein the plurality of requested data packets are stored in the queue when the signalling load within the involved Radio Network Controller is higher than a threshold value set on the Radio Network Controller specifications.

8. The method according to claim 1 wherein the plurality of requested data rackets are stored in the queue depending on a priority of the User Equipment.

9. The method according to claim 8 wherein the priority of the User Equipment is set by an operator using Allocation Retention Priority—Traffic Handling Priority parameters.

10. An auxiliary device for optimizing signalling load in a cellular communication network comprising:
- at least a data communications bus for transmitting and receiving data packets between a Radio Network Controller, a programmable device, and a storage device for storing the transmitted and received data packets in a queue,
- wherein the Radio Network Controller is configured to determine a reception of a request for a plurality of data packets for delivery to the User Equipment, and
- wherein the programmable device is configured to:
    - forward the requested data packets via the data communications bus for storage in the queue;
    - processes said requested plurality of data packets to thereby set-up Radio Access Bearer (RAB) or Radio Bearer (RB) services for delivering the requested data packets from the queue to the User Equipment only when at least one of the following conditions is met:
        - at least one requested data packets of the plurality of requested data packets has been stored in the queue for a period to time longer than a time threshold value;
        - a volume of the plurality of requested data packets stored in the queue exceeds a data threshold value; and
        - a request for the requested data packets is determined to have been triggered by a specific end user of the User Equipment.

11. The auxiliary device according to claim 10 wherein the storage device is selected from a group consisting of: non volatile memories, volatile memories, magnetic storage means and optical storage means.

12. The auxiliary device according to claim 10 wherein the programmable device is a microcontroller.

* * * * *